A. B. COX.
TRACK LAYING TRACTOR.
APPLICATION FILED SEPT. 22, 1919.

1,355,540.

Patented Oct. 12, 1920.
2 SHEETS—SHEET 1.

Abraham B. Cox, Inventor,
By his Attorney,
W. B. Hutchinson.

A. B. COX.
TRACK LAYING TRACTOR.
APPLICATION FILED SEPT. 22, 1919.

1,355,540.

Patented Oct. 12, 1920.
2 SHEETS—SHEET 2.

Abraham B. Cox, Inventor
By his Attorney,
W. B. Hutchinson.

UNITED STATES PATENT OFFICE.

ABRAHAM B. COX, OF CHERRY VALLEY, NEW YORK.

TRACK-LAYING TRACTOR.

1,355,540.   Specification of Letters Patent.   Patented Oct. 12, 1920.

Application filed September 22, 1919. Serial No. 325,452.

*To all whom it may concern:*

Be it known that I, ABRAHAM B. Cox, a citizen of the United States, and a resident of Cherry Valley, Otsego county, New York, have invented a new and useful Improvement in Track-Laying Tractors, of which the following is a full, clear, and exact description.

My invention relates to improvements in track laying tractors, and the general object of my invention is to produce an efficient, durable, comparatively light, and mobile tractor of this character. The track laying tractors generally in use are of heavy construction, and usually have an arrangement of plates and chains which are very cumbersome, heavy, and expensive, and moreover they are of such a character that the tractors necessarily move very slowly. My invention is intended to obviate these difficulties and to produce a track laying tractor which is lighter than those ordinarily used, and which is far more mobile, so that it is possible to drive the tractor without undue strain or stress at a comparatively high rate of speed. My invention is also intended to produce a tractor having less parts than the tractors generally used, and more especially my invention embodies a rope drive which will operate without lubrication and cause the tractor to move smoothly and comparatively swiftly. In connection with this idea I incase the drive ropes, which should be of wire, between inner and outer plates, the inner plates having preferably though not necessarily, a resilient bearing upon the treads of the wheels thereby insuring good traction, while the outer plates preferably overlap and are arranged to afford an efficient tread for the tractor. These outer plates can be made to overlap in part so as to make a continuous bearing surface upon the ground, and they can likewise be corrugated. The inner and outer plates which incase the rope drive are fastened together, and as a result I get a smooth working, rapidly moving, and highly efficient tractor. If desired the inner and outer plates can at their edges be formed into teeth, or can carry teeth, which will engage corresponding teeth on the wheel rims, thus supplementing the rope drive by a tooth drive, which will prevent any slipping under severe strains. All of which will be more clearly understood from the description which follows, Reference is to be had to the accompanying drawings forming a part of this specification, in which similar reference characters indicate corresponding parts in all the views.

Figure 1:
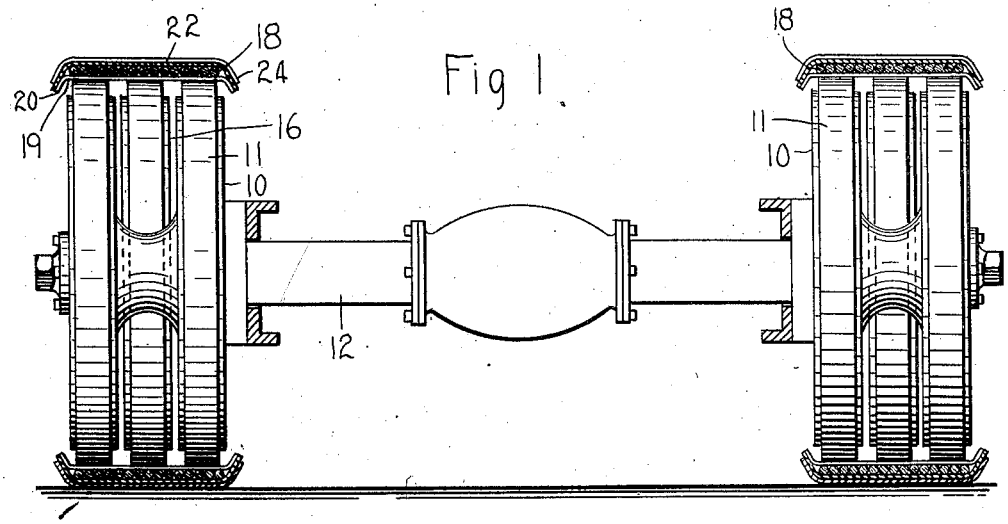
Figure 1 is a sectional elevation on the line 1—1 of Fig. 3, showing two track laying elements united, as for instance they would be if forming a part of a truck.
Figure 2:
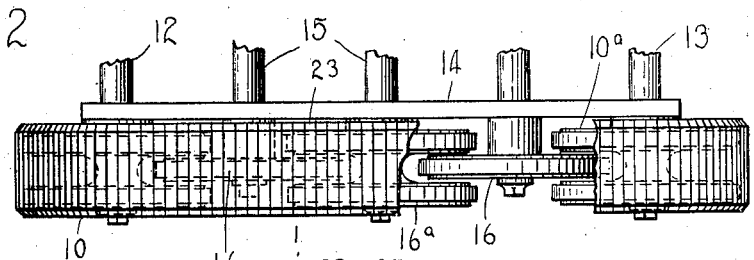
Fig. 2 is a broken plan view of one of the tractors.

The tractor is provided with a main wheel 10 which can be of any usual or preferred construction, and I have shown the conventional wheel having two tread surfaces spaced apart, and each provided with a solid rubber tire or tread 11, though so far as my invention is concerned this particular form of wheel is not necessary and the tire can be a pneumatic one if preferred, or the wheel can be used without a tire, but I prefer a tire having more or less resilience as the drive gets a better grip on it as will presently appear. In Fig. 1 I have shown two tractors or tractor elements in which the wheels 10 are connected by the conventional axle 12 which can be of any usual type. At the front end of each tractor is a wheel $10^a$ corresponding to the wheel 10, and the wheels 10 and $10^a$ are provided with axles 12 and 13 which can be united by a frame 14 in which are journaled the axles 15 of the intermediate or supporting wheels 16 and $16^a$. These can be arranged efficiently and compactly as shown in Fig. 2, with the wheels 16 extending between the members of the wheels 10 and $10^a$ having split rims, and between the rims of the wheel $16^a$ which can be conveniently like the wheels 10 and $10^a$. These wheels $16$—$16^a$ serve as supports for the track or tread of the track laying tractor, as will presently appear.

Figure 3:
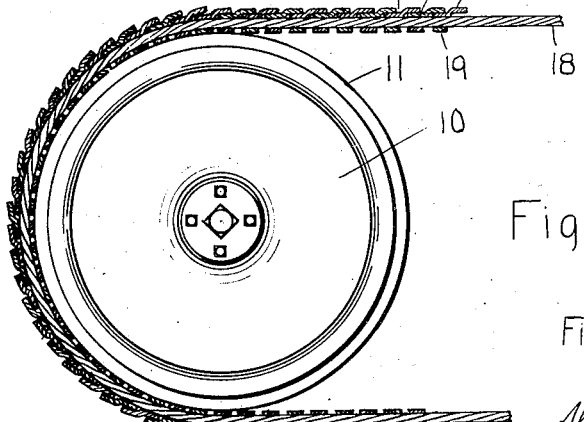
Fig. 3 is a longitudinal sectional elevation at right angles to that shown in Fig. 1.
Figure 4:
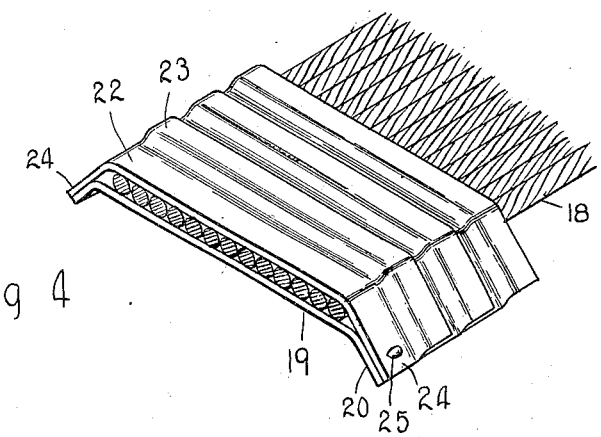
Fig. 4 is a broken detail perspective of a part of the rope drive.
Figure 5:
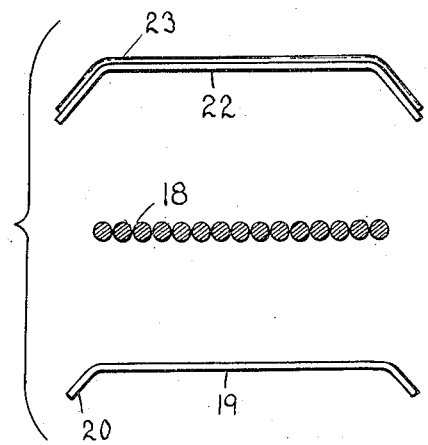
Fig. 5 is a development partly in section of the rope drive.

Instead of the chains and links generally used for driving I employ a rope drive comprising the necessary number of strands of rope 18 which can be and should be preferably of wire, and extends in belt form over the wheels 10—10ª. This rope drive forms a part of the tread or track of the tractor, and the strands of rope are held between the inner plates 19 and the outer plates 22 which form the casing for the drive, and the outer plates form the tread or track of the tractor. The inner plates 19 are spaced slightly apart and are sufficiently narrow to pass readily around the wheels 10—10ª without kinking or tilting so as to unduly strain the strands of rope 18. To further obviate any difficulty of this kind the plates can be thinned slightly at their edges as shown at 21 in Fig. 6, and they are also at their outer ends preferably bent inward as shown at 20 so as to overlap the edges of the wheels 10—10ª and 16ª. The outer plates 22 are preferably made as shown clearly in Fig. 3, with one portion bearing flat against the rope strands 18 and with another portion bent outwardly and forwardly as shown at 23, so that the part 23 of one plate overlaps the part 22 of the next, and the plates are preferably bent inward at the outer ends as shown at 24 in Fig. 4, so that the plates 22 and 19 can be riveted together as shown at 25, or they can be otherwise fastened, and if necessary the fastening can extend between the strands of rope. If desired the outer plates can be corrugated, but the overlapping arrangement above described serves the purpose of corrugation to a great extent, gives the plates a good grip on the ground, and enables them to run smoothly around the wheels 10—10ª. The plates 19 and 22 are made sufficiently narrow to enable them to adhere closely to the wheels 10 and 10ª and follow the contour of the wheels without slapping and pounding, and without any portion of the outer plates projecting tangentially from the wheel to any appreciable extent.

From the foregoing description it will be seen that the rope drive comprising the strands 18 in connection with the inner and outer plates 19 and 22 form a driving belt which also serves the purpose of a tread or track, and it will be understood that the manner in which the rope strands are incased can be departed from very materially without affecting the invention. It will be further observed that to insure the best grip of the drive on the wheels 10—10ª and without any undue slip, it is desirable to have the wheels 10—10ª provided with tires which are more or less resilient, but it will be further seen that the drive will work efficiently though not so noiselessly and smoothly, even if the wheels 10—10ª were not provided with tires.

It will be further noticed that the construction which I have described makes an exceedingly smooth and powerful drive which can be operated at rather high speed without any of the clanking effect of the ordinary drive, and that it is less likely to get out of order or break down than the tractor drives in which chain links are employed. It will be further noticed that by using the bent plates for the tread or track of the drive in connection with the ropes, the plates run more smoothly around the wheels, do not project so far away from the wheels as they turn, and pass more smoothly over obstructions.

Attention is called further to the fact that the tractors may be coupled up transversely as shown in Fig. 1 for use on trucks or the like, or each tractor can be used individually as a driving element.

Figure 7:
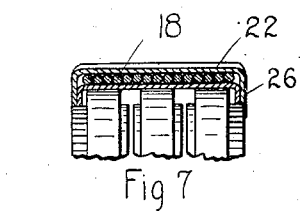
Fig. 7 is a broken cross section through a part of the wheel rim and drive showing a slight modification of the invention.
Figure 8:
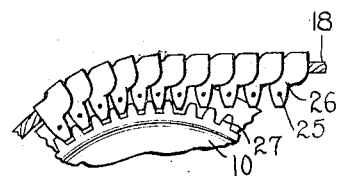
Fig. 8 is a broken sectional elevation of the structure shown in Fig. 7 showing the formation of the teeth on the edges of the casing which incloses the ropes.
Figure 6:
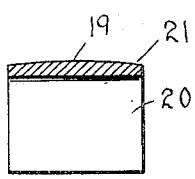
Fig. 6 is a detail of a preferred construction of one of the inner plates of the rope drive.

In Figs. 6 and 7 is shown a slight modification of the construction, which can be very easily made, and which will prevent any possibility of slipping, thus rendering the structure more suitable for very heavy work or in places where the utmost strain would be thrown upon the drive. This structure does not interfere with the structure already described. As here shown the parts 20 and 24 are bent in a little sharper as shown clearly in Fig. 7, and are formed into teeth 26 (see Fig. 8), and the rivets 25 are located so as to pass through the several teeth. These teeth engage corresponding teeth 27 which are produced on the rim of the wheel 10, and thus I get the combination of the rope drive above described which is sufficient for all ordinary usage, and an additional tooth drive which prevents any possibility of slipping. It will be noticed that this does not add materially to the cost of the structure, does not make any complication, but makes a stronger drive.

In the foregoing description the rope or belt drive is described and is also shown as being driven from the rear wheel, but it will of course be evident that it might be driven by other wheels as well without affecting the invention, and I wish to call attention to the fact also that the use of rubber tires 11, while affording better traction, also has the added advantage of giving greater resiliency to the vehicle.

I claim:—

1. A track laying tractor having wheels spaced apart, and a belt-like track running over the wheels, consisting of parallel cables in close connection, and outer and inner plates between which the cables are clamped, said plates being plain through their middle portions and inturned at the edges of the track so as to overlap the edges of the track wheels.

2. A track laying tractor comprising track wheels spaced apart, and a belt-like track formed of closely lying parallel cables and inner and outer plates clamping the cables between them, the plates being fastened together and inturned at the edges, said edges having teeth thereon to engage complementary parts on the wheel.

3. A track laying tractor comprising wheels spaced apart and a belt-like track connecting the wheels and consisting of closely lying parallel cables, outer and inner plates clamping the cables between them and securely fastened together, the plates being inturned at the edges of the track and formed into teeth which engage corresponding teeth on the wheels.

4. A track laying tractor comprising wheels spaced apart and a belt-like track consisting of closely lying parallel cables, and outer and inner narrow plates fastened together and securing the cables between them, the inner plates being narrow and slightly spaced, and the outer plates being offset near the center forming two parts lying in different planes whereby the inner part of one element lies against the cables and the outer part of said element overlaps and lies upon the inner portion of the next adjacent plate, the outer and inner plates being inturned at the ends to form guides to prevent the track from running off the wheels.

ABRAHAM B. COX.

Witnesses:
WARREN B. HUTCHINSON,
HUBERT HUTCHINSON.